(12) United States Patent
Faihe

(10) Patent No.: US 7,827,161 B2
(45) Date of Patent: Nov. 2, 2010

(54) DOCUMENT RETRIEVAL

(75) Inventor: Yassine Faihe, Champagnier (FR)

(73) Assignee: Hewlett-Packard Development Company, L.P., Houston, TX (US)

(*) Notice: Subject to any disclaimer, the term of this patent is extended or adjusted under 35 U.S.C. 154(b) by 378 days.

(21) Appl. No.: 11/716,993

(22) Filed: Mar. 12, 2007

(65) Prior Publication Data

US 2007/0219989 A1   Sep. 20, 2007

(30) Foreign Application Priority Data

Mar. 14, 2006 (EP) .............................. 06300229

(51) Int. Cl.
*G06F 17/30* (2006.01)
(52) U.S. Cl. .................. 707/706; 707/708; 707/710; 707/771
(58) Field of Classification Search ............... 707/1–6, 707/104.1
See application file for complete search history.

(56) References Cited

U.S. PATENT DOCUMENTS

| | | | |
|---|---|---|---|
| 5,263,159 A * | 11/1993 | Mitsui ............................. 1/1 |
| 5,905,980 A * | 5/1999 | Masuichi et al. ................ 707/1 |
| 5,944,839 A | 8/1999 | Isenberg |
| 6,078,914 A | 6/2000 | Redfern et al. |
| 6,182,090 B1 * | 1/2001 | Peairs ........................ 715/209 |
| 6,321,192 B1 | 11/2001 | Houchin et al. |
| 6,678,694 B1 * | 1/2004 | Zimmermann et al. ...... 707/102 |
| 6,912,523 B2 * | 6/2005 | Mitsugi .......................... 707/3 |
| 7,480,652 B2 * | 1/2009 | Wen et al. ......................... 1/1 |
| 7,617,195 B2 * | 11/2009 | Liang et al. ....................... 1/1 |
| 7,680,773 B1 * | 3/2010 | Acharya et al. ............. 709/217 |
| 2002/0065957 A1 * | 5/2002 | Rubin ........................ 709/330 |
| 2002/0156817 A1 * | 10/2002 | Lemus ....................... 707/531 |
| 2003/0088583 A1 | 5/2003 | Izuoka et al. |
| 2003/0101153 A1 | 5/2003 | Francis et al. |
| 2005/0022114 A1 * | 1/2005 | Shanahan et al. ........... 715/513 |
| 2005/0071333 A1 * | 3/2005 | Mayfield et al. ............... 707/5 |
| 2005/0086224 A1 * | 4/2005 | Franciosa et al. .............. 707/6 |
| 2005/0108200 A1 * | 5/2005 | Meik et al. ..................... 707/3 |
| 2005/0278623 A1 * | 12/2005 | Dehlinger et al. ........... 715/517 |
| 2007/0233456 A1 * | 10/2007 | Kim ............................. 704/2 |
| 2008/0005651 A1 * | 1/2008 | Grefenstette et al. ........ 715/500 |

FOREIGN PATENT DOCUMENTS

| | | |
|---|---|---|
| WO | WO 97/15009 A | 4/1997 |
| WO | WO 00/68793 A | 11/2000 |
| WO | WO 03/023649 A | 3/2003 |

OTHER PUBLICATIONS

European Search Report for EP Application No. 06300229.9-2201, received Nov. 9, 2006.

* cited by examiner

*Primary Examiner*—Don Wong
*Assistant Examiner*—Hanh B Thai

(57) ABSTRACT

According to one aspect of the present invention, there is provided a method of identifying a document in a support automation system in response to receiving diagnostic data, the documents being stored in a database, comprising analysing the diagnostic data and retrieving, in response to the analysis, one more keywords, and searching the database using the one or more retrieved keywords to identifying one or more documents therein.

8 Claims, 1 Drawing Sheet

DOCUMENT RETRIEVAL

The present application claims foreign priority to European patent application EP 06300229.9, filed on Mar. 16, 2009, which is incorporated by reference in its entirety.

The present invention relates generally to the field of document retrieval.

The use of support automation systems or automated diagnostic systems, such as knowledge base systems, in the automated or semi-automated resolution of problems, such as computer problems, is well known. For example, the Applicant's co-pending European Patent Application 04300378.9 entitled "Computer Support Service With Solution Function Updates As A Function Of Pre-Delivery Expert Changes To Automatically Generated Solutions", for example, describes such a system, and is incorporated herein, by reference, in its entirety.

Such systems typically function by receiving customer diagnostic data gathered in response to a problem encountered by a customer. Using a suitable analysis engine the diagnostic data is analysed and one or more knowledge documents, identified by way of a unique document identifier, are identified. A document identifier may be linked to diagnostic data by, for example, a suitable rule, establishing a degree of similarity with diagnostic data relating to a previously resolved problem, using an appropriate statistical model, and the like, as will be readily apparent to those skilled in the art.

A knowledge document typically details one or more proposed solutions for resolving the diagnosed problem. Finally, a report including the identified documents may be generated and published, or otherwise made available, to the person experiencing the problem, thereby generally enabling that person to resolve the problem by following or executing the proposed solution or solutions.

The typical tight linkage that exists between the analysis engine and each knowledge document is, however, problematic, especially given that knowledge documents generally evolve over time. For example, if a knowledge document expires or is removed from the knowledge database, all links, or identifiers, to that document must be replaced in the analysis engine in order for the replacement knowledge document to be identified. Furthermore, if new knowledge documents relevant to an exiting mapping are added to the knowledge database, the analysis engine requires updating with details of the new documents to enable the new documents to be proposed by the analysis engine following an analysis of diagnostic data.

Accordingly, one aim of the present invention is to overcome, or at least to alleviate, at least some of the above-mentioned problems.

According to a first aspect of the present invention, there is provided a method of identifying a document in a support automation system in response to receiving diagnostic data, the documents being stored in a database. The method comprises analysing the diagnostic data and retrieving, in response to the analysis, one more keywords, and searching the database using the one or more retrieved keywords to identifying one or more documents therein.

Advantageously, the previously tight linkage between a document identifier identified in response to an analysis of diagnostic data and the document having that identifier in a knowledge base is replaced by a more flexible and robust system.

Suitably, the method further comprises sorting the one or more identified documents into order of relevancy.

The step of identifying may further comprise obtaining the document identifier of each identified document.

The method may further comprise obtaining each identified document from the database using its associated obtained document identifier.

Suitably, the method further comprises generating a report from the obtained documents.

Suitably, the keywords are linked to the diagnostic data by at least one of a rule, establishing a degree of similarity with a previous resolved problem, and using a statistical model.

Suitably, the keywords are obtained from a specific document.

Suitably, the step of searching the database using the keywords identifies the specific document or an equivalent document.

According to a second aspect of the present invention there is provided a support automation system adapted to operate in accordance with any of the above method steps.

According to a third aspect of the present invention, there is provided 10 a method of processing document identifiers in a support automation system comprising identifying a document identifier, retrieving the document identified by the document identifier, generating one or more keywords based on the retrieved document, and replacing the identified document identifier with the one or more generated keywords.

Embodiments of the present invention will now be described, by way of non-limiting example only, with reference to the accompanying drawings, in which.

Figure 1:
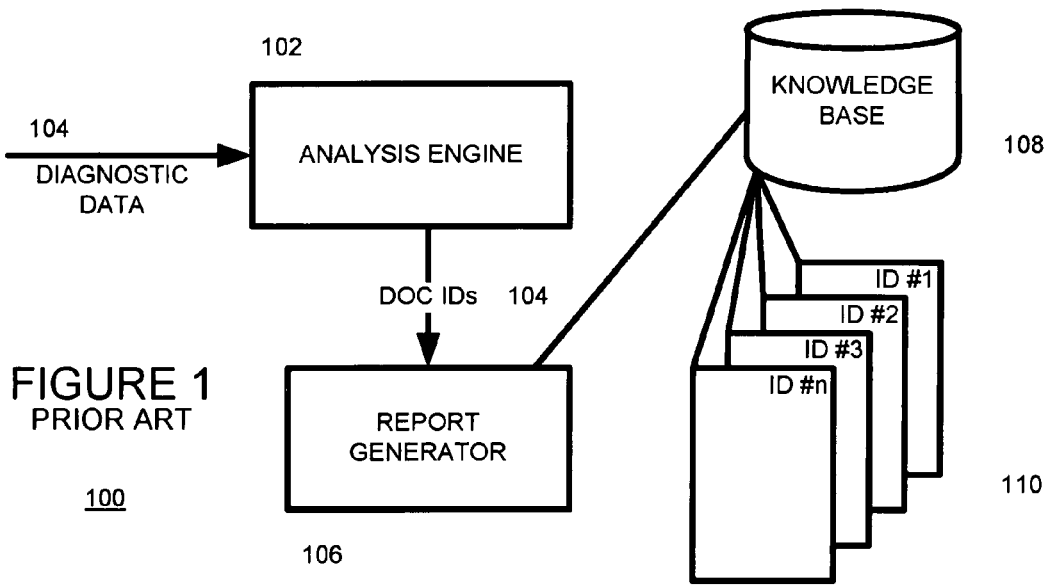
FIG. 1 is a block diagram showing a support automation system 100 according to the prior art.

FIG. 1 shows a block diagram of a support automation system 100 according to the prior art. The support automaton system 100 comprises an analysis engine 102 that analyses diagnostic data 104 collected in response, for example, to a problem. The diagnostic data 104 may be obtained in any number of generally known ways.

The analysis engine 102 analyses the diagnostic data 104 and identifies one or more document identifiers 104 each of which identify one or more documents 110 stored in a knowledge database 108. Each knowledge document describes one or more possible solutions to the diagnosed problem.

A report generator 106 receives the identified document identifiers 104 from the analysis engine 102, retrieves the actual knowledge documents identified thereby. The report generator then extracts metadata from the retrieved documents which may include metadata such as the document title, abstract, actual link or document identifier, and the like, and generates a report including the metadata. The generated report may then be made available to the customer or person concerned in any suitable manner.

As previously mentioned, the typical tight linkage that exists between the analysis engine and each knowledge document is, however, problematic, especially given that knowledge documents generally evolve over time. For example, if a knowledge document expires or is removed from the knowledge database, all links, or identifiers, to that document must be replaced in the analysis engine in order for the replacement knowledge document to be identified instead. Furthermore, if new knowledge documents relevant to an existing mapping are added to the knowledge database, the analysis engine requires updating with the details of the new documents to enable the new documents to be proposed by the analysis engine.

Figure 2:
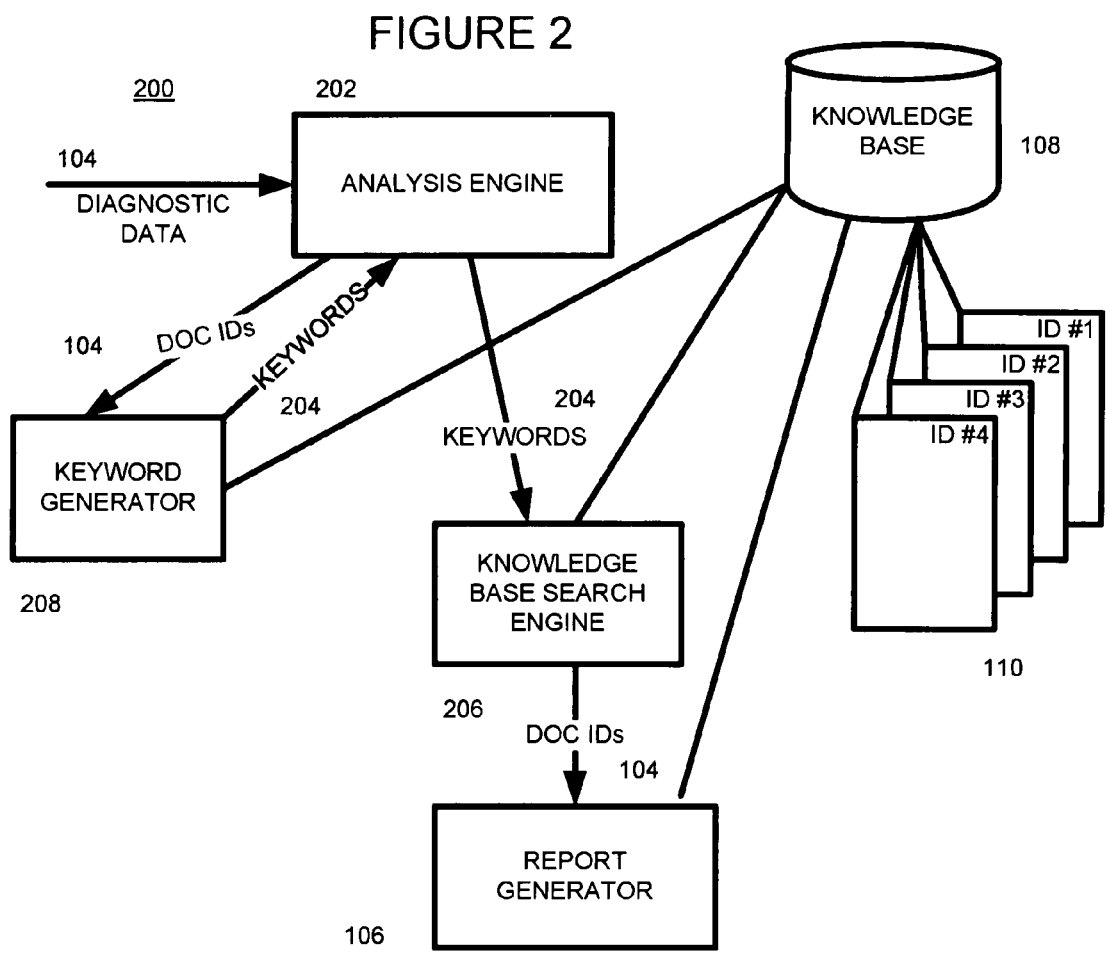
FIG. 2 is a block diagram showing a support automation system 200 according to an embodiment of the present invention.

Referring now to FIG. 2, there is shown a support automation system 200 according to an embodiment of the present invention. Some of the elements of the system 200 are common elements with the system 100 of FIG. 1, and are identified by having like references.

An analysis engine 202 receives diagnostic data 104 and, using appropriate analysis techniques, identifies one or more keywords 204. The keywords 204 may be obtained by the analysis engine in a similar manner to the way in which the document identifiers are obtained by the analysis engine in the system of FIG. 1. In other words, the one or more keywords may be linked to diagnostic data by, for example, a suitable rule, establishing a degree of similarity with diagnostic data of a previously resolved problem, using an appropriate statistical model, and the like.

The keywords may be generated in various ways, as described below.

For example, the prior art support automation system of FIG. 1 may be transformed into a support automation system in accordance with an embodiment of the present invention by replacing the document identifiers linked to diagnostic data with keywords. A keyword generator 208, scans the analysis engine and for each document identifier found, obtains the document from the knowledge base 108, and extracts one or more keywords from the obtained document.

The aim of the keyword generator is to generate keywords that will later help identify the obtained document from the knowledge base 108 by searching the knowledge base using the generated keywords while minimizing the number of irrelevant documents identified. However, as described further below, it is not essential that the obtained document be obtained from such a search. The generated keywords are then returned to the analysis engine such that the generated keywords may be obtained by the analysis engine in response to a future analysis of appropriate diagnostic data.

The keywords may be generated in any suitable manner and may include, for example, a document index, one or more extracted keywords, the document title, the document abstract. Additionally the document identifier may be included as a keyword, although this preferably in addition to other keywords.

Keywords may also be generated and entered into the analysis engine manually, for example, by a subject matter expert if, for example, the analysis engine 202 is unable to automatically resolve a problem and requires human intervention. The subject matter expert may, for example, manually extract keywords from a specific document, or may generate keywords based on something other than a specific document, for example from his personal knowledge.

Keywords may also be associated a weighting parameter which may be used by a knowledge base search engine 206 to help identifier relevant documents or to rank identified documents.

In operation, and in response to analysis of the diagnostic data 104, the analysis engine obtains one or more keywords 204 which are then input to the knowledge base search engine 206. The search engine 206 searches the knowledge base 108 using the keywords 104 and attempts to identify one or more documents in the knowledge base 108 that best match the keywords. If the keywords identified by the analysis engine were suitably selected, either by the keyword generator 208 or the subject matter expert, from a specific document there is a reasonable likelihood that that document be among the one or more identified documents. If more than one document is identified the documents may be sorted, in any appropriate manner, for example in order of determined relevancy. The sorting may be further assisted if one of the keywords 204 includes the document identifier of the document or if keyword weighting is used. The specific document may be determined to be the highest, or at least amongst the highest, ranking documents.

However, as will be appreciated by those skilled in the art, even if the document having the included document identifier is no longer available in the knowledge base 108, the other keywords should help identify an alternative document of similar relevance. In many cases if the original knowledge document has been removed from the knowledge base, and an updated replacement document added, the search has a high likelihood of identifying the replacement document.

The search engine 206 is arranged to obtain the document identifier of each document identified in the knowledge base 108 and to supply the obtained document identifiers 206 to a report generator 106. The search engine 206 may be arranged to supply a predetermined maximum number of document identifiers to the report generator 106.

The report generator 106, as described above with reference to FIG. 1, obtains the documents identified by the document identifiers 104 from the knowledge base 108 and generates an appropriate report suitable for being made available, for example to the customer or person who experience the initial problem. As previously mentioned, appropriate metadata may also be included in the report.

Although the above embodiments have been described with reference to support automation or automatic diagnostic systems, those skilled in the art will appreciate that the same or similar methods and apparatus may be applicable in other equivalent fields.

The invention claimed is:

1. A method of identifying a document from multiple documents in a support automation system in response to receiving diagnostic data, the documents being stored in a database, comprising:
   obtaining a document identifier for each of the documents;
   obtaining each of the identified documents from the database using its associated document identifier;
   replacing document identifiers for the documents stored in the database with one or more keywords extracted from the documents;
   analysing the diagnostic data and retrieving, in response to the analysis, one or more keywords; and
   searching the database using the one or more retrieved keywords to identify one or more documents therein.

2. A method according to claim 1, further comprising, sorting the one or more identified documents into order of relevancy.

3. A method according to claim 2, further comprising generating a report from the identified documents.

4. A method according to claim 1, wherein the keywords are linked to the diagnostic data by at least one of a rule, establishing a degree of similarity with a previous resolved problem, and using a statistical model.

5. A method according to claim 4, wherein the step of searching the database using the keywords identifies the specific document or an equivalent document.

6. A method of claim 1, wherein the keywords are obtained from a specific document.

7. A support automation system adapted to operate in accordance with the method of claim 1.

8. A method of processing document identifiers in a support automation system comprising:
   identifying a document identifier;
   retrieving the document identified by the document identifier from a database storing the document;
   generating one or more keywords based on the retrieved document; and
   replacing the identified document identifier with the one or more generated keywords.

* * * * *